（12）United States Patent
Diab et al.

(10) Patent No.: US 7,752,472 B2
(45) Date of Patent: Jul. 6, 2010

(54) PROTOCOL AND INTERFACE BETWEEN A LAN ON MOTHERBOARD (LOM) AND A POWERED DEVICE (PD) FOR A PERSONAL COMPUTING DEVICE (PCD)

(75) Inventors: Wael William Diab, San Francisco, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 102 days.

(21) Appl. No.: 11/819,271

(22) Filed: Jun. 26, 2007

(65) Prior Publication Data

US 2008/0016263 A1    Jan. 17, 2008

Related U.S. Application Data

(60) Provisional application No. 60/816,879, filed on Jun. 28, 2006.

(51) Int. Cl.
*G06F 1/18* (2006.01)
(52) U.S. Cl. ...................................... 713/310
(58) Field of Classification Search .......... 713/300–340
See application file for complete search history.

(56) References Cited

U.S. PATENT DOCUMENTS 5,889,381 A * 3/1999 Wakefield .................. 320/106

(Continued)

FOREIGN PATENT DOCUMENTS

WO    WO 2005036815 A1 *  4/2005

OTHER PUBLICATIONS

802.3af ™, IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI), *IEEE Computer Society, IEEE*, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

*Primary Examiner*—Paul R Myers
(74) *Attorney, Agent, or Firm*—Sterne, Kessler, Goldstein & Fox P.L.L.C.

(57) ABSTRACT

A Power-over-Ethernet (PoE) communication system dynamically provides power and data communications over a communications link. In a computing environment made up of one or more personal computing devices (PCD) and/or one or more powered devices (PD), power source equipment (PSE) determines an allocated amount of power to be supplied to each device. The personal computing devices include a unified LAN-On-Motherboard (LOM) that combines the functionality of a powered device (PD) controller of a conventional PD and a LOM of a conventional personal computing device into a single unified subsystem. The unified LOM includes a standard or universal interface between the LOM and PD controller so that different types of PD devices with differing functionality can be easily married to the LOM, without requiring significant hardware or software redesign. The universal or standard interface includes a physical interface between the LOM and the PD controller and a compatible communication protocol to govern the communications between the LOM and the PD controller. This allows the LOM to be mixed and matched with any PD controller, enabling OEMs to economically provide multiple product models with varying degrees of PD and LOM functionality.

31 Claims, 10 Drawing Sheets

U.S. PATENT DOCUMENTS

| | | | |
|---|---|---|---|
| 6,473,608 B1 * | 10/2002 | Lehr et al. | 455/402 |
| 6,764,343 B2 * | 7/2004 | Ferentz | 439/620.01 |
| 6,909,943 B2 * | 6/2005 | Lehr et al. | 700/286 |
| 6,986,071 B2 * | 1/2006 | Darshan et al. | 713/330 |
| 7,046,983 B2 * | 5/2006 | Elkayam et al. | 455/402 |
| 7,117,272 B2 * | 10/2006 | Rimboim et al. | 709/250 |
| 7,143,299 B1 * | 11/2006 | Rubinstein et al. | 713/320 |
| 7,203,849 B2 * | 4/2007 | Dove | 713/300 |
| 7,231,535 B2 * | 6/2007 | Le Creff et al. | 713/340 |
| 7,320,078 B2 * | 1/2008 | Balestriere | 713/300 |
| 7,340,325 B2 * | 3/2008 | Sousa et al. | 700/295 |
| 7,343,506 B1 * | 3/2008 | Fenwick | 713/340 |
| 7,363,525 B2 * | 4/2008 | Biederman et al. | 713/340 |
| 7,368,798 B2 * | 5/2008 | Camagna et al. | 257/499 |
| 7,454,641 B2 * | 11/2008 | Connor et al. | 713/324 |
| 2005/0276023 A1 * | 12/2005 | Zansky et al. | 361/731 |
| 2006/0244462 A1 * | 11/2006 | McCosh et al. | 324/522 |
| 2007/0074052 A1 * | 3/2007 | Hemmah et al. | 713/300 |
| 2007/0257780 A1 * | 11/2007 | Schindler | 340/310.11 |
| 2008/0005433 A1 | 1/2008 | Diab et al. | |
| 2008/0005600 A1 | 1/2008 | Diab et al. | |
| 2008/0005601 A1 | 1/2008 | Diab | |
| 2008/0005602 A1 | 1/2008 | Diab et al. | |

* cited by examiner

PROTOCOL AND INTERFACE BETWEEN A LAN ON MOTHERBOARD (LOM) AND A POWERED DEVICE (PD) FOR A PERSONAL COMPUTING DEVICE (PCD)

CROSS REFERENCE TO RELATED APPLICATIONS

This patent application claims the benefit of U.S. Provisional Patent Application No. 60/816,879, filed Jun. 28, 2006, entitled "Power over Ethernet for a Laptop Computer," which is incorporated herein by reference in its entirety.

BACKGROUND OF THE INVENTION

1. Field of the Invention

The present invention generally relates to personal computing devices (e.g., personal or laptop computers) in a Power over Ethernet (PoE) system, and more specifically to an interface and a protocol to govern communications between a powered device (PD) controller and a LAN on Motherboard (LOM) in a personal computing device.

2. Related Art

Ethernet communications provide high speed data communications over a communications link between two communication nodes that operate according the IEEE 802 Ethernet Standard. The communications medium between the two nodes can be twisted pair wires for Ethernet, or other types of communications medium that are appropriate. Power over Ethernet (PoE) communication systems provide power and data communications over a common communications link. More specifically, a power source device (e.g., power source equipment (PSE)) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

The PSE device is often a data switch. Typically, a PSE on a switch is called an endspan device. The switch is typically a networking bridge device with data ports that can additionally have routing capability. The switch could have as little as two data ports or as many as 400 or more data ports. It may have two or more rows of data ports, where a data port in an input row of data ports can be switched to any one of the data ports in an output row of data ports. Each data port can include a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Typical PD devices that utilize PoE include Internet Protocol (IP) phones (Voice over IP (VoIP) phones), wireless access points, etc. Personal computing devices, such as personal or laptop computers, are another example of PD devices. The integration of PoE into a conventional personal computing device raises several issues that must be overcome. For example, the hardware (H/W) architecture of the conventional personal computing device requires extensive modification of the physical interface between the conventional personal computing device and the PD device to access the PoE subsystem. Likewise, implementation of PoE requires widespread modification of the software (S/W) architecture of the conventional personal computing device, such as the communication protocol for governing a communication between the conventional personal device and the PD device to provide an example. Therefore, what is needed is a personal computing device that solves the addresses the issues of integrating PoE into a conventional personal computing device.

Further, it is also desirable to provide flexibility for Original Equipment Manufactures (OEM) to combine and market personal computing devices (PCDs) with various levels and types of PoE functionality. More specifically, it is desirable to enable OEMs to easily mix and match conventional personal computer (PC) components with PoE components of varying functionality. In order to do so, what is a needed is a universal standard interface between the PD device and the corresponding PC components so that different types of PD devices with differing functionality can be easily married to PC components, without requiring significant hardware or software redesign. This will enable an OEM to economically offer various PCD models having differing levels of PoE functionality.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Figure 1:
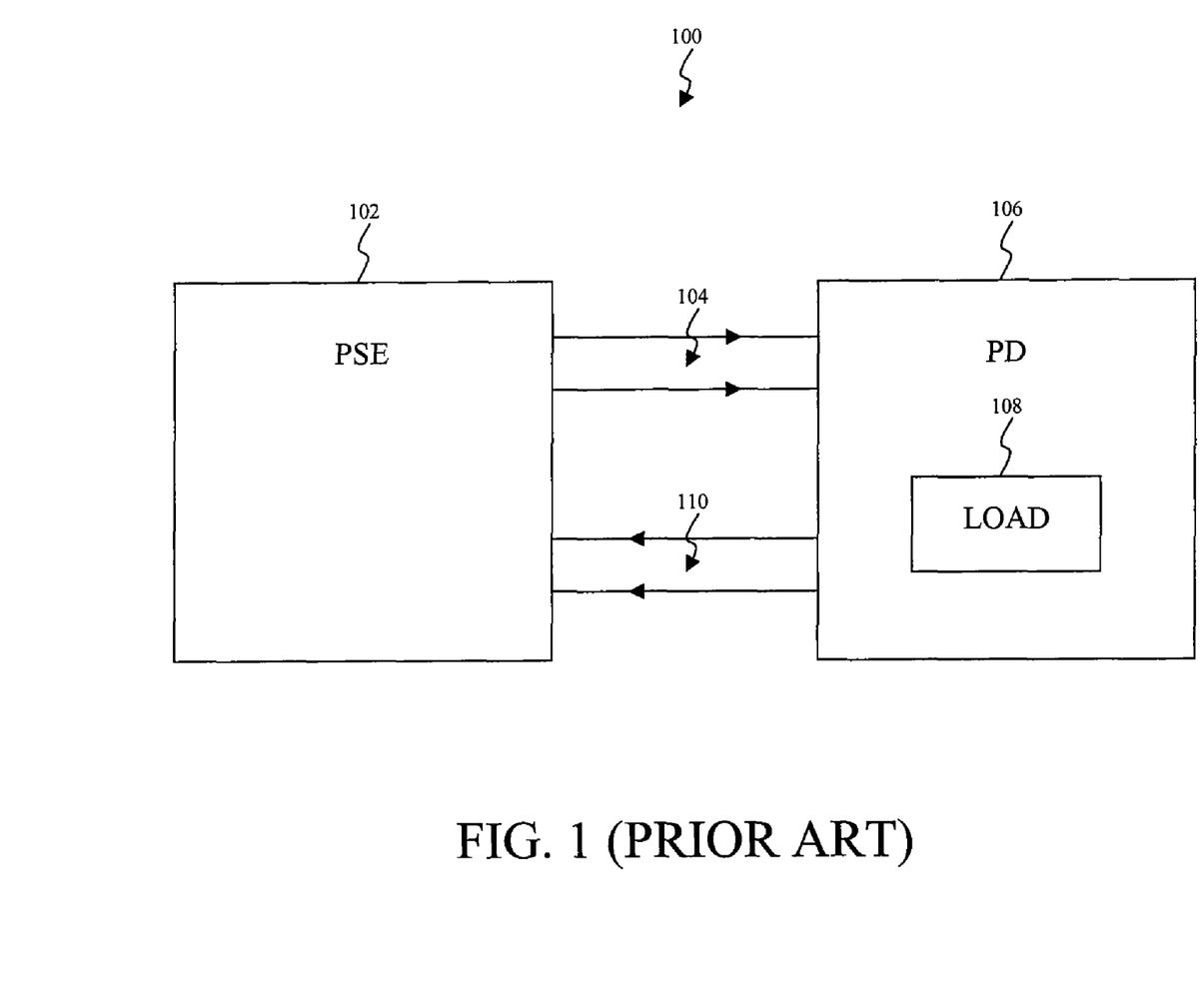
FIG. 1 is a block diagram of a conventional Power over Ethernet (PoE) system.

FIG. 1 is a block diagram of a conventional Power over Ethernet (PoE) system. More specifically, FIG. 1 illustrates a high level diagram of a conventional Power over Ethernet (PoE) system 100 that provides both DC power and data communications over a common data communications medium. Referring to FIG. 1, the power source equipment 102 provides DC power over conductors 104, 110 to a powered device (PD) 106 having a representative electrical load 108. The power source equipment 102 provides PoE according to a known PoE standard, such as the IEEE 802.3af™ standard, the IEEE 802.3at™ standard, the IEEE 802.3™ standard, a legacy PoE transmission, and/or any suitable type of PoE transmission standard to provide some examples. The power source equipment 102 and PD 106 also include data transceivers that operate according to a known communications standard, such as a 10BASE-T, a 100BASE-TX, a 1000BASE-T, a 10GBASE-T, and/or any other suitable communication standard to provide some examples. More specifically, the power source equipment 102 includes a physical layer device on the PSE side that transmits and receives high speed data with a corresponding physical layer device in the PD 106, as will be discussed further below. Accordingly, the power transfer between the power source equipment 102 and the PD 106 occurs simultaneously with the exchange of high speed data over the conductors 104, 110. In one example, the power source equipment 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
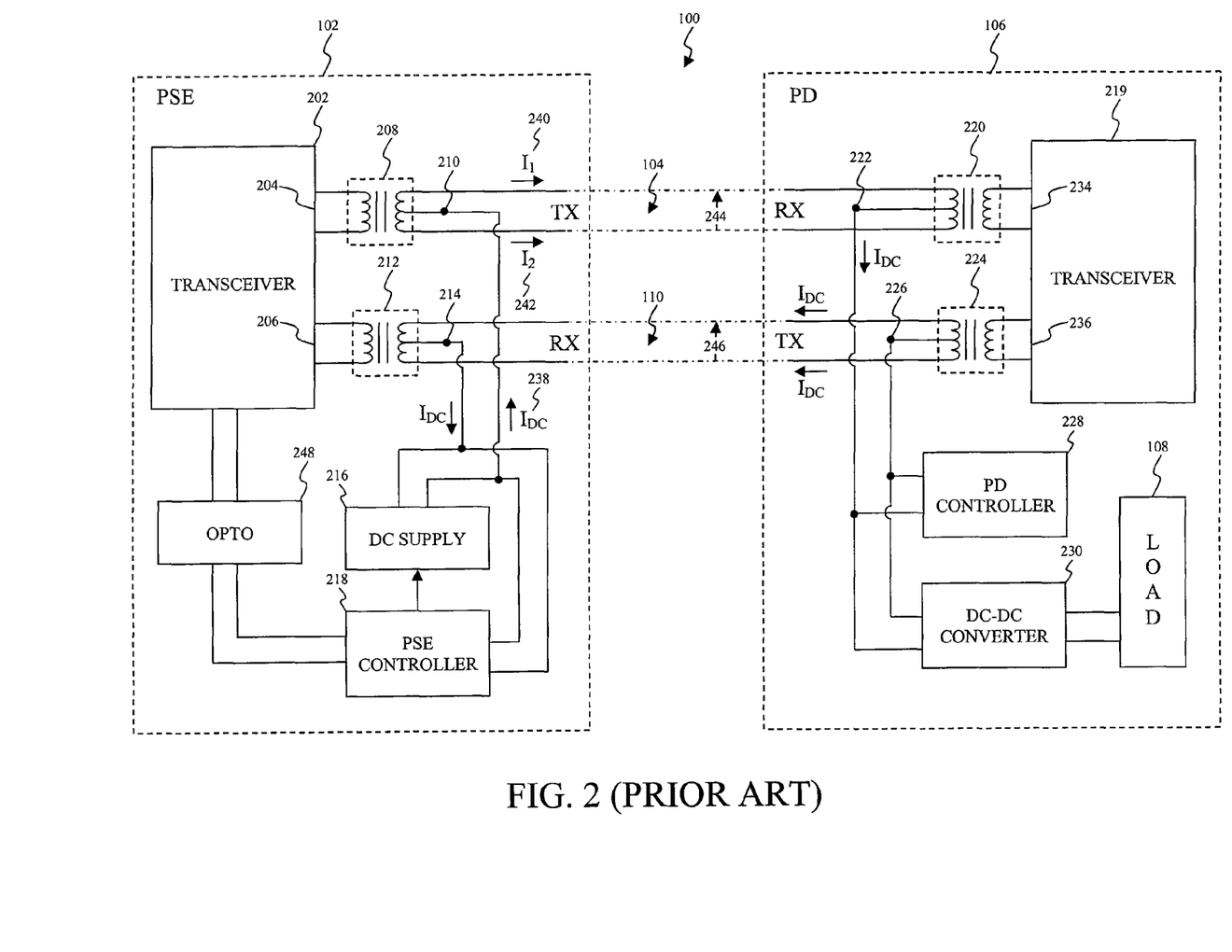
FIG. 2 illustrates a more detailed figure of the conventional power transfer from Power source equipment (PSE) to a Powered Device (PD) in a conventional PoE communications system.

FIG. 2 illustrates a more detailed figure of the conventional power transfer from Power source equipment (PSE) to a Powered Device (PD) in a conventional PoE communications system. More specifically, FIG. 2 provides a more detailed circuit diagram of the PoE system 100, where the power source equipment 102 provides power for PoE to PD 106 over conductor pairs 104 and 110. The power source equipment 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The power source equipment 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard and the IEEE 802.3™ standard, both of which are incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the power source equipment 102 and the PD 106 occurs simultaneously with the DC power supply described above. Accordingly, a first communication signal 244 and/or a second communication signal 246 are simultaneously differentially carried via the conductor pairs 104 and 110 between the power source equipment 102 and the PD 106. It is important to note that the communication signals 244 and 246 are differential signals that ideally are not effected by the DC power transfer.

Figure 3:
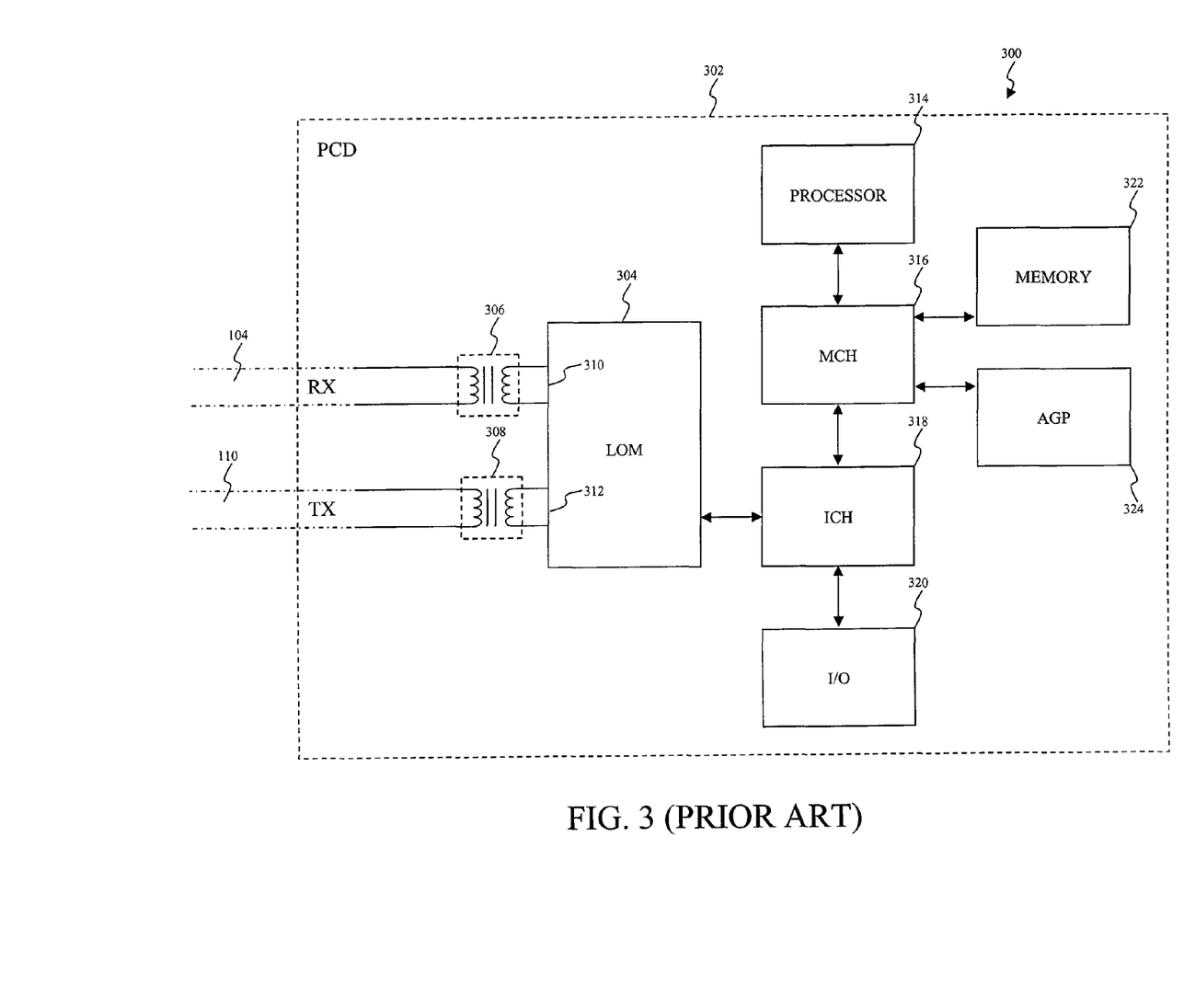
FIG. 3 illustrates a block diagram of a conventional computing architecture for a PCD without PoE, that can be implemented on a section of a mother board.

FIG. 3 illustrates a block diagram of a motherboard of a conventional personal computing device. As shown in FIG. 3, a conventional personal computing device 300 includes a motherboard 302. The motherboard 302 includes, among other chips/modules, a Local Area Network (LAN)-On-Motherboard (LOM) module 304, a processor 314, a Memory Controller Hub (MCH) 316, an Input/Output Controller Hub (ICH) 318, a super input/output (I/O) module 320, a memory 322, and a Advanced Graphics Port (AGP) 324.

The motherboard 302 includes the LOM module 304 to handle network connections. The LOM module 304 includes communication circuits, such as Ethernet circuits to provide an example, within a motherboard rather than a separate network adapter. The LOM module 304 includes full duplex transmit and receive capability through differential transmit port 312 and differential receive port 310. A transformer 306 couples high speed data between a first conductor pair 104 and the receive port 310. Likewise, a second transformer 308 couples high speed data between the transmit port 312 and a second conductor pair 110.

High speed data is passed between the LOM module 304 and the Input/Output Controller Hub 318. The Input/Output Controller Hub 318 may be referred to as a south bridge. The Input/Output Controller Hub 318 is normally given responsibility for slower devices that may include a Peripheral Component Interconnect (PCI) bus, an Industry Standard Architecture (ISA) bus, a System Management Bus (SMBus), a Direct Memory Access (DMA) controller, an Interrupt controller, an Integrated Drive Electronics (IDE) controller, a Real Time Clock, Power management, and/or a Nonvolatile BIOS memory to provide some examples. The Input/Output Controller Hub 318 may also include support for a keyboard, a mouse, and serial ports, but normally these devices are attached through the super I/O module 320. The super I/O module 320 provides connections to peripheral devices that may include a CD-ROM drive a printer, the mouse, the keyboard, a monitor, an external Zip drive, a scanner, an internal modem, a video controller, or any other suitable peripheral device to provide some examples.

The Memory Controller Hub 316, which may be referred to as a north bridge, is responsible for controlling communication between the processor 314, the Input/Output Controller Hub 318, the memory 322, and the Advanced Graphics Port (AGP) 324. The Memory Controller Hub 316 may also contain an integrated video controller (not shown). The Memory Controller Hub 316 may determine the number, speed, and type of processor for the processor 314 and the amount, speed, and type of memory for the memory 322. The Input/Output Controller Hub 318 and the Memory Controller Hub 316 may be combined into a single chip to form a single-chip design. The memory 322 contains storage for instructions and data and may include, but is not limited to, static RAM (SRAM), dynamic RAM (DRAM), Synchronous DRAM (SDRAM), non-volatile RAM (NVRAM), or Rambus DRAM (RDRAM) to provide some examples.

The processor 314 interprets computer program instructions and processes data. The processor 314 may include, but is not limited to, control circuits for executing instructions, an arithmetic logic unit (ALU) for manipulating data, and registers for storing processor status and a small amount of data to provide some examples. The processor 314 also executes or runs an operating system (O/S) of the personal computing device.

Figure 4:
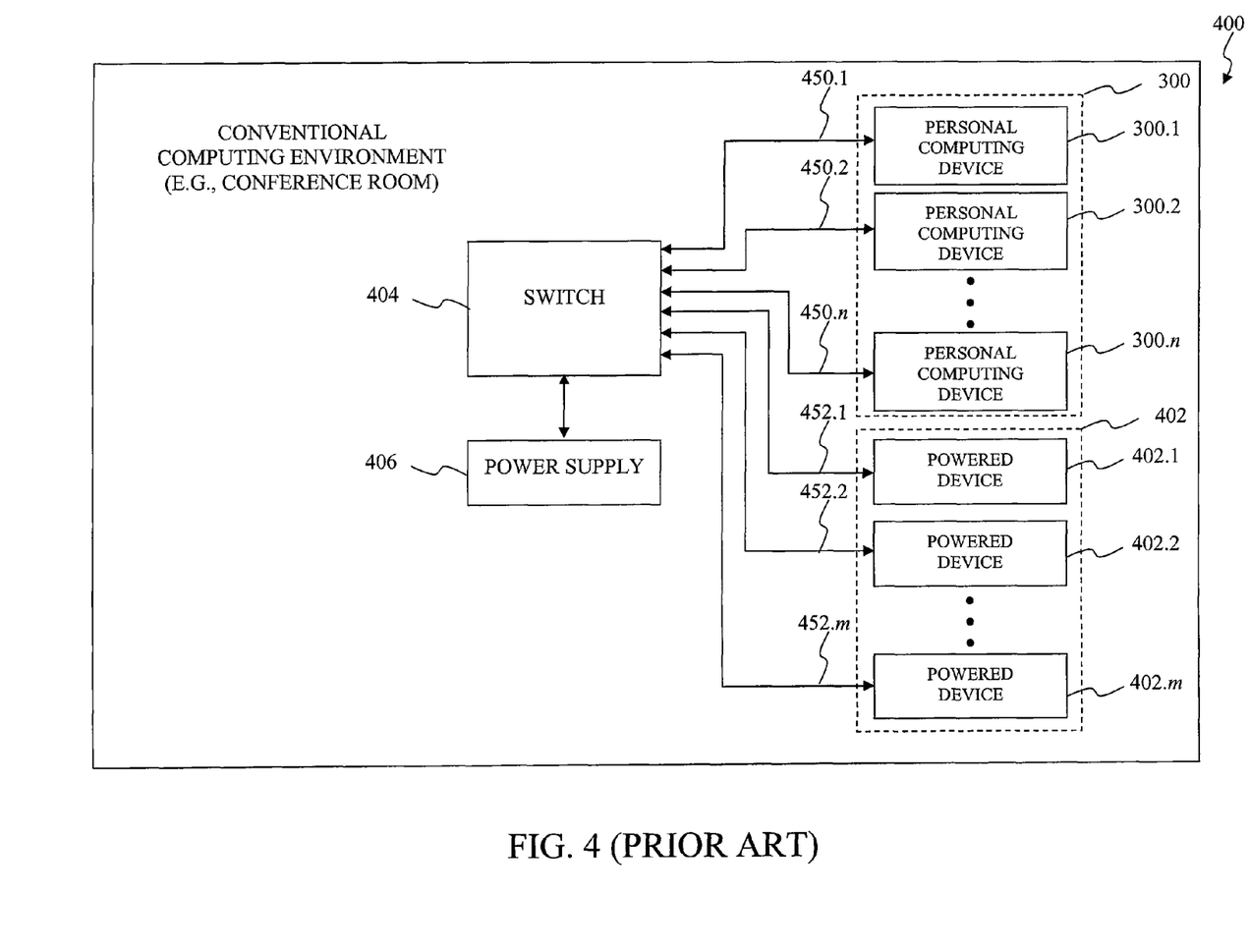
FIG. 4 illustrates a Power over Ethernet (PoE) configuration in a computing environment, using a conventional personal computing device.

FIG. 4 illustrates a Power over Ethernet (PoE) configuration in a computing environment, using a conventional personal computing device. A computing environment 400 includes conventional personal computing devices 300.1 through 300.n, hereinafter referred to as the conventional personal computing devices 300 and powered devices 402.1 through 402.m, hereinafter referred to as the powered devices 402. Computing environment 400 can be a conference room, for example, or any other environment in which the conventional personal computing devices 300 are networked. The conventional personal computing devices 300 include any suitable device, such as a desktop computer, that receives power from a source other than a communications link but is capable of data communications over the communications link.

As shown in FIG. 4, a network switch 404 and/or a power supply 406 provides data communications to the conventional personal computing devices 300 and PoE and data communications to the powered devices 402 via a network switch 404. The network switch 404 may be any networking switch that is capable of providing PoE and data communications to the powered devices 402. The network switch 404 includes one or more data ports to provide PoE and data communications to the powered devices 402. The network switch 404 may have as little as two data ports or as many as 400 or more data ports.

The network switch provides data communications to the conventional personal computing devices 300 through a corresponding interface 450.1 through 450.n, hereinafter referred to as the interface 450, whereas the network switch provides PoE and data communications to the powered devices 402 through a corresponding interface 452.1 through 452.n, hereinafter referred to as the interface 452. The powered devices 402 may include, but are not limited to Internet Protocol (IP) phones (Voice over IP (VoIP) phones), wireless access points, powered devices, such as personal or laptop computers. Those skilled in the art(s) will recognize that the powered devices 402 may include any suitable device that is capable of receiving power and data communications over a communications link without departing from the spirit and scope of the invention. Those skilled in the art(s) will recognize that the interface 450 and/or the interface 452 may include any communication link that can handle PoE, such as various types of Ethernet cabling, for example.

Figure 5:
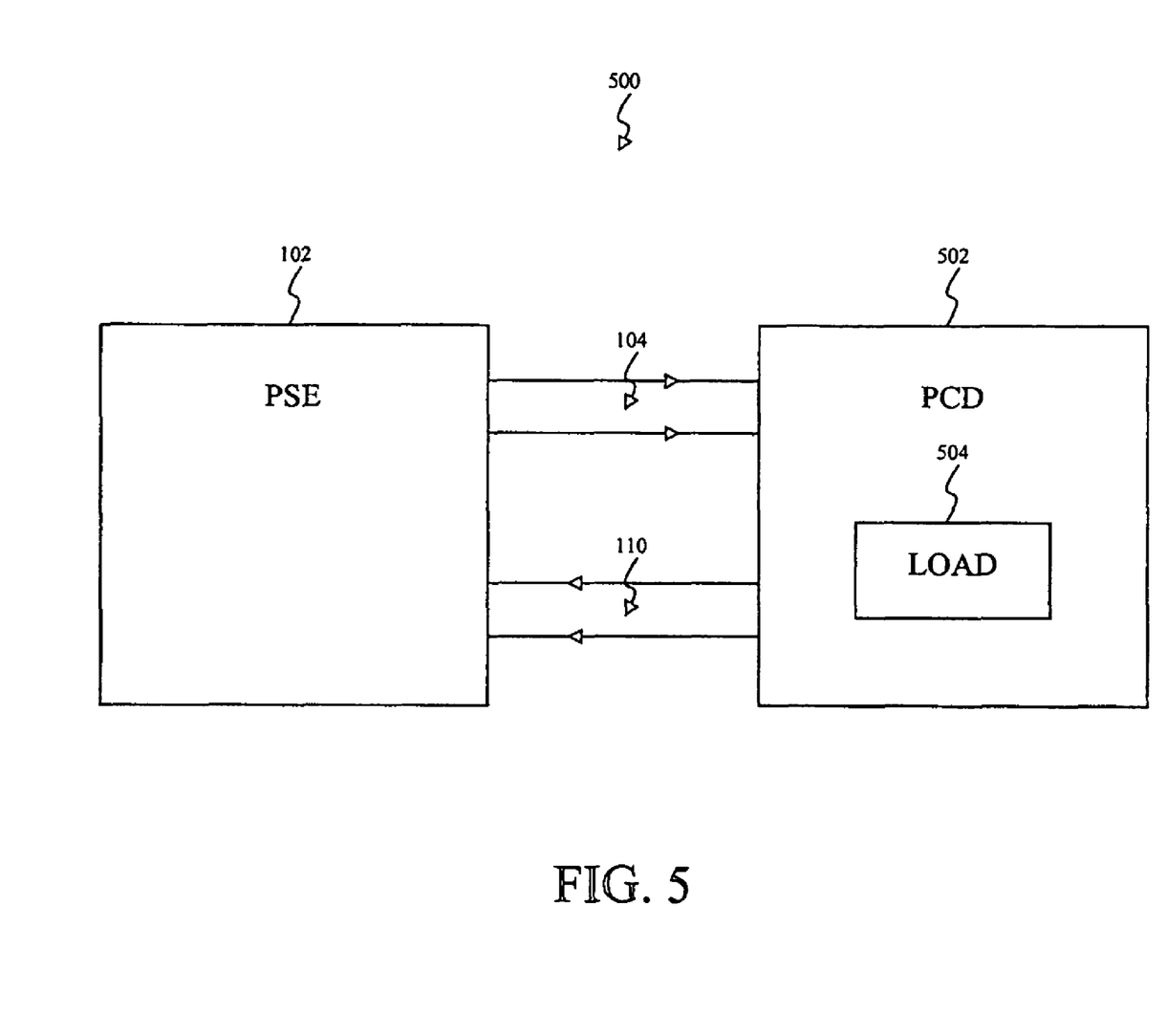
FIG. 5 is a block diagram of a Power over Ethernet (PoE) system according to an exemplary embodiment of the present invention.

FIG. 5 is a block diagram of a Power over Ethernet (PoE) system, where the PD device is a personal computing device (PCD), such as a laptop computer, a handheld device, or any other portable or hand-held device with an embedded operating system. As shown in FIG. 5, the power source equipment 102 provides PoE and data communications over conductors 104, 110 to a personal computing device (PCD) 502 having a representative electrical load 504. The power source equipment 102 provides PoE according to a known PoE standard, such as the IEEE 802.3af™ standard, the IEEE 802.3at™ standard, the IEEE 802.3™ standard, a legacy PoE transmission, and/or any suitable type of PoE transmission standard to provide some examples. Those skilled in the art(s) will recognize that the personal computing device 502 as described herein can include a personal computer, a laptop, a handheld computing device, or any other computing device with an embedded operating system, or any other powered device that is capable of receiving PoE and data communications over a communications link without departing from the spirit and scope of the invention.

The personal computing device 502 also includes data transceivers that operate according to a known communications standard, such as a 10BASE-T, a 100BASE-TX, a 1000BASE-T, a 10GBASE-T, and/or any other suitable communication standard to provide some examples. More specifically, the power source equipment 102 includes a physical layer device (PHY) on the power source equipment side that transmits and receives high speed data with a corresponding physical layer device in the personal computing device 502, as will be discussed further below. Accordingly, the power transfer between the power source equipment 102 and the personal computing device 502 occurs simultaneously with the exchange of high speed data over the conductors 104, 110.

Figure 6A:
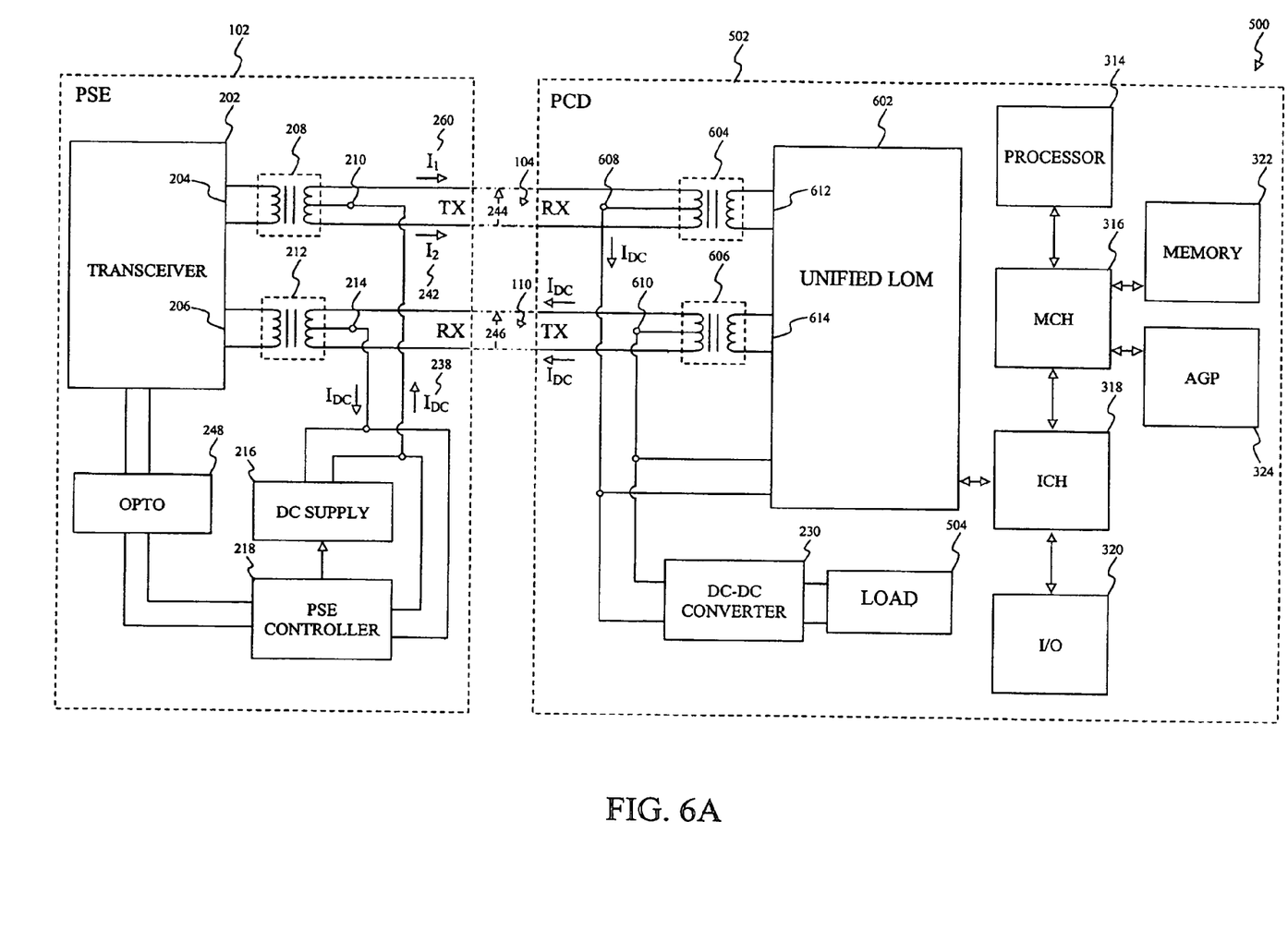
FIG. 6A illustrates a more detailed figure of the power transfer from a power source equipment (PSE) to a personal computing device (PCD) according to an exemplary embodiment of the present invention.

FIG. 6A illustrates a more detailed figure of the power transfer from a power source equipment (PSE) to a personal computing device (PCD) according to an exemplary embodiment of the present invention. More specifically, FIG. 6A provides a more detailed circuit diagram of the PoE system 500, where the power source equipment 102 provides PoE and data communications to the personal computing device (PCD) 502 over conductor pairs 104 and 110. In this exemplary embodiment, the power source equipment 102 provides power for PoE and for data communications over conductor pairs 104 and 110 in a substantially similar manner as previously described in FIG. 1 and FIG. 2.

As shown in FIG. 6A, the personal computing device 500 includes a unified LOM 602. The unified LOM 602 combines the functionality of the PD controller 228, as discussed in FIG. 2, and the functionality of the LOM module 304, as discussed in FIG. 3, into a single unified subsystem. As such, the unified LOM 602 may be implemented using a single chip or die or multiple chips or dies.

A data communication is passed between the unified LOM 602 and the ICH module 318. More specifically, the LOM module 616 has full duplex transmit and receive capability through differential transmit port 614 and differential receive port 612. A transformer 604 couples high speed data between the first conductor pair 104 and the receive port 612. Likewise, a second transformer 606 couples high speed data between the transmit port 614 and the second conductor pair 110. The respective transformers 604 and 606 pass the high speed data to and from the unified LOM 602, but isolate any low frequency or DC voltage from the sensitive transceiver data ports.

The transformer 604 includes primary and secondary windings, where the secondary winding (on the conductor side) includes a center tap 608. Likewise, the second transformer 606 includes primary and secondary windings, where the secondary winding (on the conductor side) includes a center tap 610. The center taps 608 and 610 supply the power for PoE carried over conductors 104 and 110 to the representative load 504 of the personal computing devices 502, where the load 504 represents the dynamic power draw needed to operate personal computing devices 502. A DC-DC converter 230 may be optionally inserted before the load 504 to step down the voltage as necessary to meet the voltage requirements of the personal computing devices 502. Further, multiple DC-DC converters 230 may be arrayed in parallel to output multiple different voltages (3 volts, 5 volts, 12 volts) to supply different loads 404 of the personal computing devices 502.

Figure 6B:
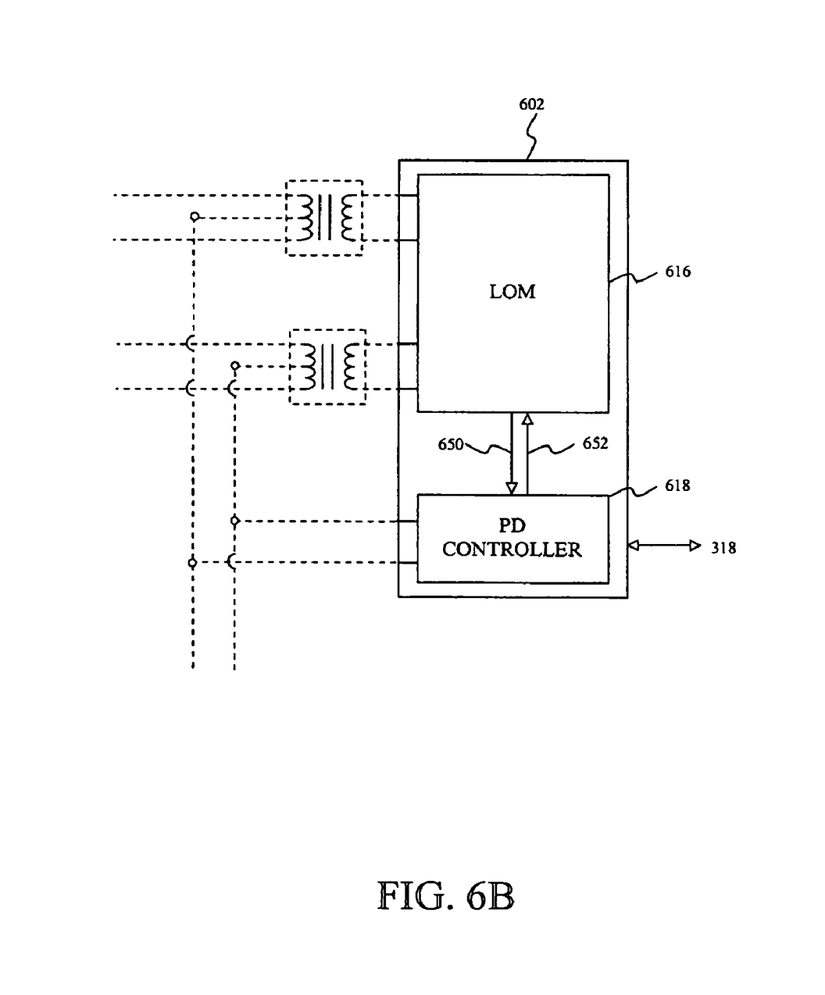
FIG. 6B illustrates a more detailed figure of a unified Local Area Network(LAN)-On-Motherboard (LOM) according to an exemplary embodiment of the present invention.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the center tap 608 to reform the direct current ($I_{DC}$) 238 so as to power the personal computing devices 502. On return, the direct current ($I_{DC}$) 238 flows from the personal computing devices 502 through the second center tap 610, and divides for transport over conductor pair 110. The return DC current recombines at the second center tap 214, and returns to the DC power supply 216. As discussed above, data transmission between the power source equipment 102 and the personal computing devices 502 occurs simultaneously with the DC power supply described above. Accordingly, a first communication signal 244 and/or a second communication signal 246 are simultaneously differentially carried via the conductor pairs 104 and 110 between the power source equipment 102 and the personal computing devices 502. It is important to note that the communication signals 244 and 246 are differential signals that ideally are not effected by the DC power transfer FIG. 6B illustrates a more detailed figure of a unified Local Area Network(LAN)-On-Motherboard (LOM) according to an exemplary embodiment of the present invention. As shown in FIG. 6B, the unified LOM 602 includes a LOM 616 and a PD controller 618. In this exemplary embodiment, the LOM 616 and the PD controller 618 are implemented on a single die or on a single chip.

It is often desirable to implement the unified LOM 602 using multiple dies or multiple chips by fabricating the LOM 616 and the PD controller 618 on multiple dies or within multiple chips. For example, the PD controller 618 may be implemented using a 100V process, whereas the LOM 616 may be implemented using a 10V process.

Referring back to FIG. 6B, the LOM 616 communicates with the PD controller 618 via interface 650. Likewise, the PD controller 618 communicates with the LOM 616 via interface 652. Those skilled in the art(s) will recognize that LOM 616 and the PD controller 618 may communicate with one another using a single or bi-directional interface without departing from the spirit and scope of the invention.

Figure 6C:
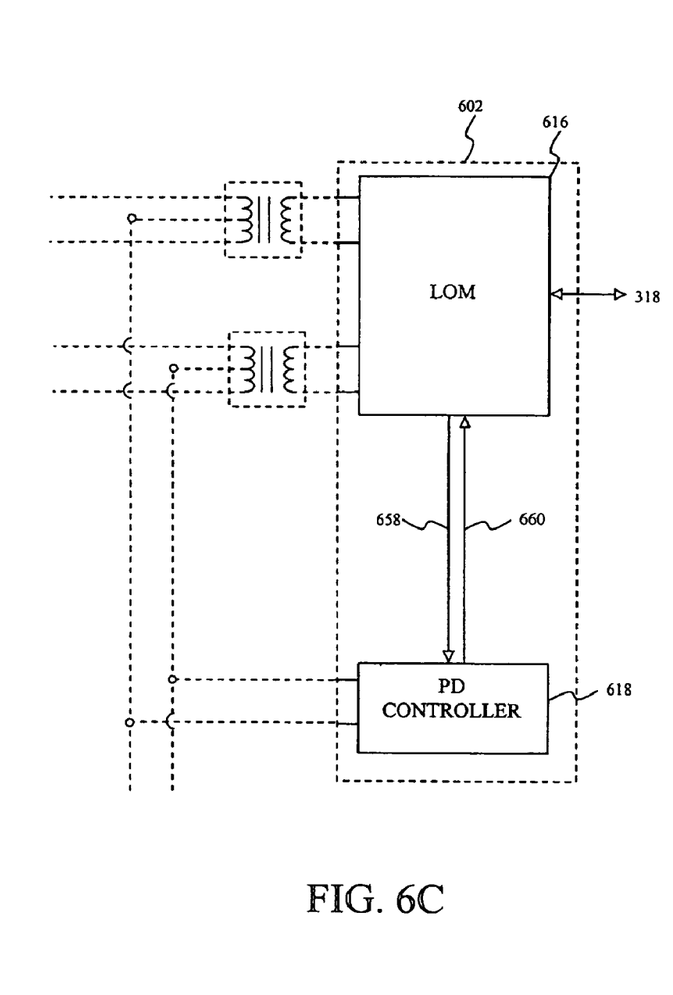
FIG. 6C illustrates a more detailed figure of a unified Local Area Network(LAN)-On-Motherboard (LOM) according to another exemplary embodiment of the present invention.

FIG. 6C illustrates a more detailed figure of a unified Local Area Network(LAN)-On-Motherboard (LOM) according to another exemplary embodiment of the present invention. In this exemplary embodiment, the LOM 616 and the PD controller 618 are implemented on multiple dies or as multiple chips.

The LOM 616 communicates with the PD controller 618 via interface 658. Likewise, the PD controller 618 communicates with the LOM 616 via interface 660. Those skilled in the art(s) will recognize that LOM 616 and the PD controller 618 may communicate with one another using a single or bi-directional interface without departing from the spirit and scope of the invention.

Figure 6D:
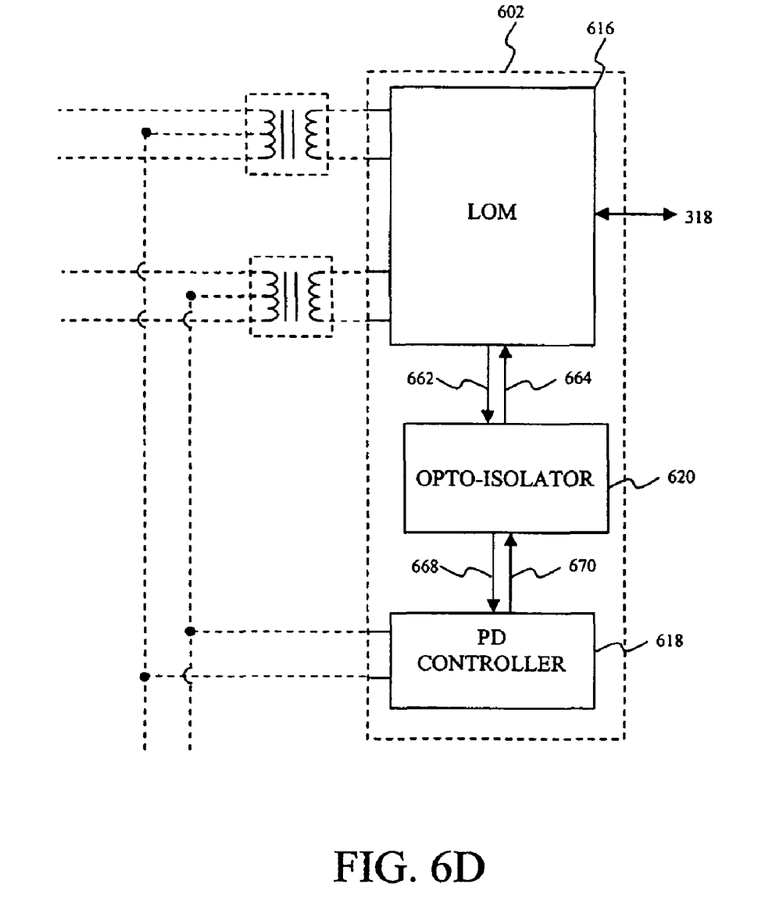
FIG. 6D illustrates a more detailed figure of a unified Local Area Network(LAN)-On-Motherboard (LOM) according to a further exemplary embodiment of the present invention.

FIG. 6D illustrates a more detailed figure of a unified Local Area Network(LAN)-On-Motherboard (LOM) according to a further exemplary embodiment of the present invention. In this exemplary embodiment, the LOM 616 and the PD controller 618 are implemented on multiple dies or as multiple chips. In this exemplary embodiment, an optional opto-isolator 620 may be used to bypass an isolation boundary between the LOM 616 and the PD controller 618. In particular, the opto-isolator 620 bypasses the isolation boundary by converting an input from an electrical signal to an optical signal. Then optical signal is then converted back to an electrical signal to bypass the isolation boundary.

Referring back to FIG. 6D, the LOM 616 communicates with the optional opto-isolator 620 via interface 662. The optional opto-isolator 620 passes the communication onto the PD controller 618 via interface 668. Likewise, the PD controller 618 communicates with the optional opto-isolator 660 via interface 670. The optional opto-isolator 620 passes the communication onto the LOM 616 via interface 664. Those skilled in the art(s) will recognize that LOM 616 and the PD controller 618 may communicate with one another using a single or bi-directional interface without departing from the spirit and scope of the invention. In those exemplary embodiments that do not require the optional opto-isolator 620.

The interface 650, the interface 652, the interface 658, the interface 660, the interface 662, the interface 664, the interface 668, and/or the interface 670, may include, but is not limited to, a physical interface and a communication protocol to govern communications between the LOM 616 and the PD controller 618. The physical interface may be implemented as a serial interface and may be governed by, but is not limited to, 1-Wire, HyperTransport, Inter-Integrated Circuit ($I^2C$) Bus, PCI Express (PCIe), Serial Peripheral Interface (SPI) Bus, Universal Serial Bus (USB), FireWire i.Link or IEEE 1394, or any other suitable serial communication protocol to provide some examples. Alternatively, the physical interface may be implemented as a parallel interface and may be governed by, but is not limited to, Extended ISA or EISA, Industry Standard Architecture (ISA), Low Pin Count (LPC), MicroChannel (MCA), MBus, Multibus, NuBus or IEEE 1196, Peripheral Component Interconnect (PCI), S-100 bus or IEEE 696, SBus or IEEE 1496 VESA Local Bus (VLB), VMEbus, the VERSA module Eurocard bus or any other suitable parallel communication protocol to provide some examples.

In addition to the various serial and parallel architectures, the physical interface (for interfaces 650, 652, 658, 660, 662, 664, 668, 670) is voltage and frequency agnostic. In other words, any suitable voltage level or signal frequency can be used for the physical interface, based on the specific application at hand. For example, low voltages can be used on the physical interface for low power applications. Additionally, the signal frequency of the physical interface can be increased or decreased to accommodate higher or lower bandwidth and data rate requirements for the interface. Additionally, various and differing messaging protocols can be used for the communications protocol.

Providing a compatible physical interface between the LOM 616 and the PD controller 618 and a compatible communication protocol to govern the communication between the LOM 616 and the PD controller 618 allows for the seamless integration of the LOM 616 and the PD controller 618 into a single unified subsystem. For example, a LOM 616 having an $I^2C$ serial interface may communicate with any suitable PD controller 618 capable of receiving communications over the $I^2C$ serial interface. This allows for the LOM 616 to be integrated with any PD controller 618 so long as the physical interface and the communication protocol are also compatible. In other words, so long as the physical interface between the LOM 616 and the PD controller 618 and the communication protocol to govern the communication between the LOM 616 and the PD controller 618 are compatible, the LOM 616 can be mixed and matched with any PD controller 618. Similarly, a PD controller 618 having an $I^2C$ serial interface may communicate with any suitable LOM 616 capable of receiving communications over the $I^2C$ serial interface. This allows for the PD controller 618 to be integrated with any LOM 616 so long as the physical interface and the communication protocol are also compatible. In other words, so long as the physical interface between the PD controller 618 and the LOM 616 and the communication protocol to govern the communication between the PD controller 618 and the LOM 616 are compatible, the PD controller 618 can be mixed and matched with any LOM 616.

Stated another way, the LOM/PD interface described herein is capable of providing a universal or standard interface that enables a single platform for various combinations of LOM and PD devices that can be married around the universal LOM/PD interface. Accordingly, Original Equipment Manufactures (OEMs) can offer multiple product lines having several variations of PoE capabilities around a common LOM, or several variations of LOM/PC capabilities around a common PD, with minimal impact on the software or hardware designs because the interface would be standard. For example, products with multi-power level PoE support could be offered for a common LOM/PC, or multiple LOM/PC variations (WLAN, 10 G Ethernet, etc.) could be offered for a common PD. Accordingly, the standard interface enables OEMs to economically leverage their existing system architectures and offer several product variations for different market segments, all built around the standard LOM/PD interface.

Referring back to FIG. 6A, the unified LOM 602 may be viewed as a single unified subsystem including the LOM module 616 and the PD controller 618. As such, the unified LOM 602 seamlessly integrates PoE into a personal computing device by managing PoE through existing structure of the personal computing device, such as software drivers and Access Protocol Interfaces (API), to provide some examples. In other words, the LOM 602 includes programmable registers and messages that may be read using existing software drivers and Access Protocol Interfaces of the personal computing device, thereby eliminating a need to develop new drivers and APIs.

As discussed in FIG. 2, the PD controller 228 monitors the voltage and current on the PD side of the PoE configuration and provides the necessary impedance signatures during initialization. Similarly, the unified LOM 602 monitors operational parameters, such as the voltage and the current of the personal computing device and provides the necessary impedance signatures during initialization, so that the PSE controller 218 will recognize the personal computing device as a valid PoE device, and be able to classify its power requirements.

Figure 7:
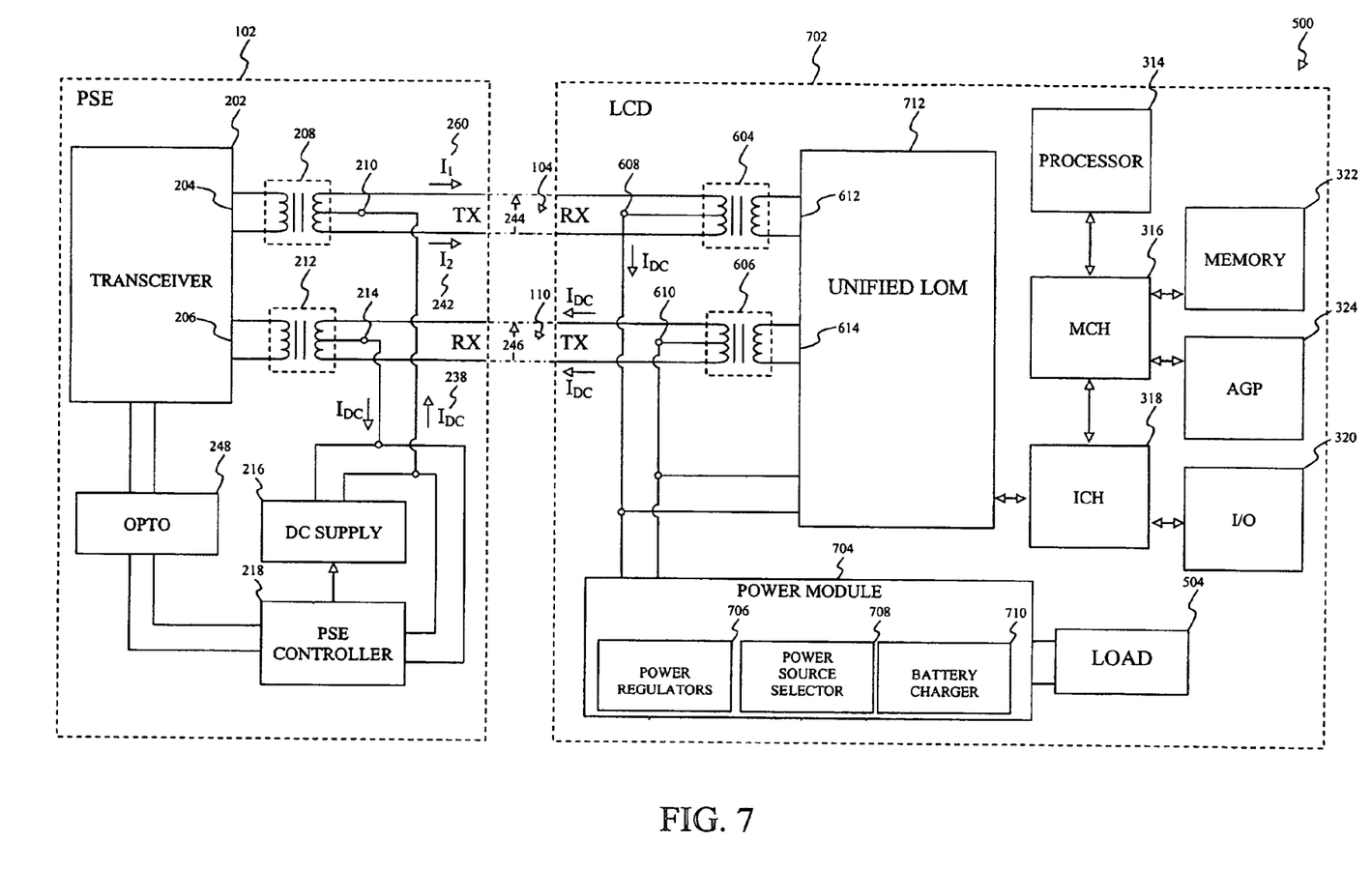
FIG. 7 illustrates a more detailed figure of the power transfer from a power source equipment (PSE) to a laptop computing device (LCD) according to an exemplary embodiment of the present invention.

FIG. 7 illustrates a more detailed figure of the power transfer from a power source equipment (PSE) to a laptop computing device (LCD) according to an exemplary embodiment of the present invention. More specifically, FIG. 7 provides a more detailed circuit diagram of the PoE system 500, where the power source equipment 102 provides PoE and data communications to a laptop computing device (LCD) 702 over conductor pairs 104 and 110. In this exemplary embodiment, the power source equipment 102 provides PoE and data over conductor pairs 104 and 110 in a substantially similar manner as previously described in FIG. 1 and FIG. 2.

As shown in FIG. 7, the laptop computing device 702 includes a unified LOM 712. Unified LOM 712 operates in a substantially similar manner as the unified LOM 602. The operation and implementation of the unified LOM 712 is previously described above in FIG. 6A through FIG. 6C. The LCD 702 also includes a PoE power module 704. The PoE power module 704 can include, for example, a power regulator 706, a power source selector 708, and a battery charger 710. The power regulator 706 may be optionally inserted before the load 504 to step down the voltage as necessary to meet the voltage requirements of the LCD 702. Further, multiple power regulators 706 may be arrayed in parallel to output multiple different voltages (3 volts, 5 volts, 12 volts) to supply different loads 504 to the LCD 702. Power, such as the direct current ($I_{DC}$) 238, can be delivered to the battery charger 710 within the PoE power module 704, in order to charge a battery, for example.

Figure 8:
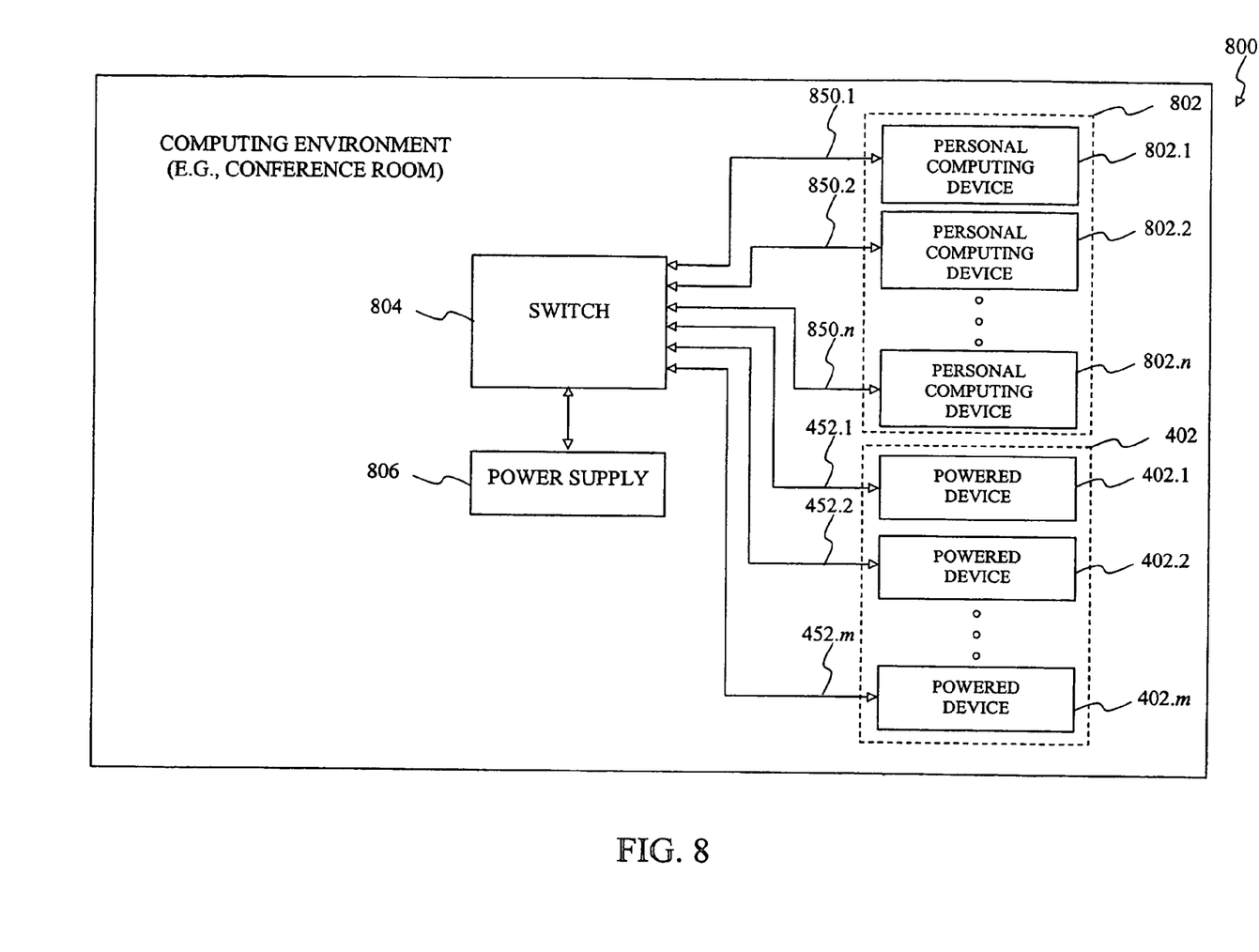
FIG. 8 illustrates a Power over Ethernet (PoE) configuration in a computing environment, according to an exemplary embodiment of the present invention.

FIG. 8 illustrates a Power over Ethernet (PoE) configuration in a computing environment, according to an exemplary embodiment of the present invention. A computing environment 800 includes personal computing devices 802.1 through 802.n, hereinafter referred to as the personal computing devices 802, and the powered devices 402. Computing environment 800 can be a conference room, for example, or any other environment in which the personal computing devices 802 are networked. The personal computing devices 802 include any suitable device, such as a the personal computing device (PCD) 502, the laptop computing device (LCD) 702, or any other suitable device that receives power for PoE and for data communications over a communications link.

As shown in FIG. 8, a power supply 806 provides power for PoE and for data communications to the personal computing devices 802 and to the powered devices 402 via a network switch 804. The network switch 804 may be any networking switch that is capable of providing PoE and data communications to the personal computing devices and/or the powered devices. The network switch 804 includes one or more data ports to provide PoE and data communications to the personal computing devices and/or the powered devices. The network switch 804 may have as little as two data ports or as many as 400 or more data ports.

The network switch provides power for PoE and for data communications to the personal computing devices 802 through a corresponding interface 850.1 through 850.n, hereinafter referred to as the interface 850. Those skilled in the art(s) will recognize that the interface 850 may include any communication link that can handle PoE, such as various types of Ethernet cabling, for example. Similarly, the network switch 804 provides PoE and data communications to the powered devices 402 through the interface 452.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A personal computing device (PCD) for a Power-over-Ethernet (PoE) system, comprising:
   a unified LAN-On-Motherboard (LOM) including a LOM and a Powered Device (PD) controller,
   wherein the LOM is coupled to the PD controller via a physical interface and a communication protocol governs a communication between the LOM and the PD controller, and
   wherein the physical interface and the communications protocol provide a universal interface that enables the LOM to be selectively mated with multiple types of PD controllers.

2. The PCD of claim 1, wherein the physical interface is a serial interface.

3. The PCD of claim 1, wherein the physical interface is a parallel interface.

4. The PCD of claim 1, wherein the communication protocol is an Inter-Integrated Circuit ($I^2C$) protocol.

5. The PCD of claim 1, wherein the LOM and the PD controller are implemented using at least one die.

6. The PCD of claim 1, wherein the PD controller is configured to monitor operational parameters of the PCD and to provide impedance signatures of the PCD during initialization.

7. The PCD of claim 6, wherein the PD controller is configured to communicate the operational parameters of the PCD to the LOM via the physical interface using the communication protocol.

8. The PCD of claim 6, wherein the operational parameters of the PCD includes at least one of a group consisting of: a voltage of the PCD and a current of the PCD.

9. The PCD of claim 6, wherein the operational parameters of the PCD includes at least one of a group consisting of: a voltage of the PCD and a current of the PCD.

10. The PCD of claim 1, wherein the physical interface includes an opto-isolator between the LOM and the PD controller.

11. A personal computing device (PCD) for a Power-over-Ethernet (PoE) system, comprising:
    a unified LAN-On-Motherboard (LOM) including a LOM and a Powered Device (PD) controller, the LOM having a first physical interface and a first communication protocol to govern a first communication between the LOM and the PD controller; the PD controller having a second physical interface and a second communication protocol to govern a second communication between the LOM and the PD controller,
    wherein at least one of the first physical interface is compatible with the second physical interface and the first communication protocol is compatible with the second communication protocol, and
    wherein the first and the second physical interfaces and the first and the second communications protocols provide a universal interface that enables the LOM to be selectively mated with multiple types of PD controllers.

12. The PCD of claim 11, wherein the first physical interface is a serial interface.

13. The PCD of claim 11, wherein the second physical interface is a serial interface.

14. The PCD of claim 11, wherein the first physical interface is a parallel interface.

15. The PCD of claim 11, wherein the second physical interface is a parallel interface.

16. The PCD of claim 11, wherein the first communication protocol is an Inter-Integrated Circuit (I²C) protocol.

17. The PCD of claim 11, wherein the second communication protocol is an Inter-Integrated Circuit (I²C) protocol.

18. The PCD of claim 11, wherein the LOM and the PD controller are implemented using at least one die.

19. The PCD of claim 11, wherein the PD controller is configured to monitor operational parameters of the PCD and to provide impedance signatures of the PCD during initialization.

20. The PCD of claim 19, wherein the PD controller is configured to communicate the operational parameters of the PCD to the LOM via the first and the second physical interfaces using the first and the second communication protocols.

21. The PCD of claim 11, wherein the physical interface includes an opto-isolator between the LOM and the PD controller.

22. In a personal computing device (PCD) configured for a Power over Ethernet (PoE) system having a LAN-On-Motherboard (LOM), a powered device (PD) controller, and an interface between a LOM and PD controller, the interface comprising:

a physical interface between the LOM and PD controller; and a communication protocol that governs a communication between the LOM and the PD controller, wherein the physical interface and the communications protocol provide a universal interface that enables the LOM to be selectively mated with multiple types of PD controllers.

23. The interface of claim 22, wherein the physical interface is a serial interface.

24. The interface of claim 22, wherein the physical interface is a parallel interface.

25. The interface of claim 22, wherein the communication protocol is an Inter-Integrated Circuit (I²C) protocol.

26. The interface of claim 22, wherein the PCD is a laptop computer.

27. The interface of claim 22, wherein the PCD is a handheld device.

28. The interface of claim 22, wherein the PCD includes an embedded operating system.

29. The interface of claim 22, wherein the PD controller is configured to monitor operational parameters of the PCD and to provide impedance signatures of the PCD during initialization.

30. The interface of claim 29, wherein the PD controller is configured to communicate the operational parameters of the PCD to the LOM via the physical interface using the communication protocol.

31. The interface of claim 29, wherein the operational parameters of the PCD includes at least one of a group consisting of: a voltage of the PCD and a current of the PCD.

* * * * *

UNITED STATES PATENT AND TRADEMARK OFFICE
CERTIFICATE OF CORRECTION

PATENT NO.      : 7,752,472 B2
APPLICATION NO. : 11/819271
DATED           : July 6, 2010
INVENTOR(S)     : Diab et al.

It is certified that error appears in the above-identified patent and that said Letters Patent is hereby corrected as shown below:

Title Page
Item (56), Foreign Patent Documents section, please replace "WO 2005036815 A1 * 4/20005" with --WO 2005036815 A1 * 4/20005 H04L 12/10.--

Column 8
Line 39, please replace "transfer" with --transfer.--.

Column 11
Line 33, please replace "a the" with --a--.

Signed and Sealed this

Twenty-eighth Day of September, 2010

David J. Kappos
*Director of the United States Patent and Trademark Office*